United States Patent Office.

HUGO BREWER, OF DUISBURG, GERMANY.

PROCESS OF UTILIZING WASTE LYE.

SPECIFICATION forming part of Letters Patent No. 544,499, dated August 13, 1895.

Application filed March 21, 1895. Serial No. 542,635. (No specimens.)

*To all whom it may concern:*

Be it known that I, HUGO BREWER, a subject of the King of Prussia, German Emperor, residing at Duisburg, Germany, have invented certain new and useful Improvements in Processes of Utilizing the Waste Lyes Resulting from the Chlorinating Roasting of Ores; and I do hereby declare the following to be a full, clear, and exact description of the invention.

My invention relates to the utilization of the lyes resulting from the lixiviation of ores or residues of such after their chlorinating roasting; and it consists in a novel process or method of treating said lyes, as will now be fully described.

In the chlorinating roasting of ores or residues of such sodium chlorid is generally employed, and this has heretofore been lost in the lyes resulting from the lixiviation of such ores. Many attempts have been made to recover the constituents of the lyes, principally the more valuable metals they may contain, with the result of a final undesirable and troublesome waste lye, so that, as a rule, the utilization or working up of these lyes has been deemed impracticable or of little advantage, particularly in so far as lyes containing zinc are concerned.

My invention has for its object a process or method of treating said lyes wherein the production of undesirable or obnoxious final waste lyes is entirely avoided, and whereby substantially all of the more valuable metals contained in the lye, together with the sodium and chlorine, may be economically and profitably recovered, such sodium and chlorine being reconverted into sodium chlorid for further use in the process of chlorinating roasting.

The object of my invention is attained by converting the sulphates in the lye into chlorids by the addition thereto of a quantity of calcium chlorid equivalent to the quantity of sulphuric acid in the sulphates. The calcium sulphate precipitate formed, which can be utilized for any desired purpose—as, for instance, in the form of plaster-of-paris—contains the sulphuric acid of the sulphates together with the calcium of the calcium chlorid used. After removal of the sulphate of calcium the lye contains zinc, and generally other metals in the form of chlorids instead of sulphates, and also the sodium of the sodium chlorid used in the roasting of the ore. The above-described constituents of the lye can be removed and the sodium reconverted into a chlorid by means of the chlorine recovered for further use in the roasting process, while the calcium may be reconverted into a chlorid also, and used over again in the process of conversion of the sulphates.

The following example will clearly show the manner of carrying out my invention: Zinc blende or other zinciferous material is subjected to the usual chlorinating roasting either *per se* or with additions of pyrites, or oxid of iron or purple ore, the roasted ore being then lixiviated in water. To the lye or liquor, which contains essentially sodium sulphate, chlorid of zinc, sodium chlorid, and sulphate of iron, besides other salts of metals, as manganese, cobalt, nickel, silver, &c., I add a quantity of calcium chlorid equal to the quantity of sulphuric acid present. The sodium sulphate, as well as the sulphates of the other metals present in the lye, are converted into their respective chlorids, the calcium precipitating in the form of a sulphate, the lye containing but a very small proportion of calcium sulphate in solution, and this is eliminated in the subsequent operation. After separating the precipitated calcium sulphate from the lye the silver, if any be present, can be precipitated by well-known means—as, for instance, by means of iodide of potassium or sodium—after which the iron, in so far as this is present in the form of a ferro-salt, is eliminated in the form of a hydroxid by means of carbonate of lime in presence of atmospheric air, the reaction taking place in accordance with the following equation:

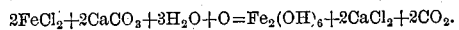

$$2FeCl_2 + 2CaCO_3 + 3H_2O + O = Fe_2(OH)_6 + 2CaCl_2 + 2CO_2.$$

The clear lye, after separation of the iron containing the chlorine of the iron salt in the form of calcium chlorid, may now be freed from nickel, cobalt, and manganese—for instance, in a well-known manner by means of chlorine, but preferably by means of hypochlorite of lime—these metals being precipitated in the form of oxids, an equivalent quantity of calcium chlorid being formed and going over into the solution.

The precipitation of manganese, cobalt, and nickel by means of hypochlorite of lime takes place according to the following equations:

Manganese—$MnO + CaCl_2O = MnO_2 + CaCl_2$,
Cobalt—$2CoO + CaCl_2O = Co_2O_3 + CaCl_2$,
Nickel—$2NiO + CaCl_2O = Ni_2O_3 + CaCl_2$.

The solution freed from the metals referred to containing essentially chlorid of zinc, sodium chlorid, and calcium chlorid, is concentrated by evaporation for electrolytical treatment, whereby the sulphate of sodium still present in small quantity or traces is separated, and nearly the whole of the sodium chlorid is obtained in a solid form. The fact that some of the zinc chlorid may go over into the sodium chlorid is of no moment, since the latter salt is again used in the process of roasting ores. Hence this zinc is not lost.

The concentrated mother lye containing zinc chlorid, calcium chlorid, and some sodium chlorid I prefer to treat electrolytically in presence of zinc and carbon electrodes, metallic zinc being deposited at the zinc cathode while the chlorine is evolved at the carbon anode. The ions may be utilized or sold, the zinc in the form it is obtained or after re-smelting, and the chlorine in a fluid form or in the form of bleaching-powder, though a portion, at least, of the chlorine may be utilized in my process.

The calcium chlorid remaining in the lye and the non-converted zinc chlorid are used in the process. Such additional calcium chlorid as may be required can be obtained at a small cost from the waste in the ammonia soda process.

In case the lyes also contain copper in sufficient quantity to warrant its extraction or to render the same necessary the lye is treated in the manner described in relation to the extraction of zinc, with the exception that either before or after the addition of chlorid of lime to the solution the silver, if present, and the copper are both eliminated successively, the former in a well-known manner and the copper by means of metallic iron, or the copper, if present in large quantity, may be obtained electrolytically together with chlorine and the remaining copper precipitated by means of metallic iron. The further treatment of the lye is then effected as described, in that the iron is removed by means of calcium carbonate in the presence of atmospheric air in the form of a hydroxid, and so on.

In the application of the invention to cupriferous lyes rich in copper a large quantity of metallic iron will be obtained in solution, and as a consequence the lye will contain a large quantity of calcium chlorid in solution after the precipitation of the iron, so that the remaining calcium chlorid lye will be sufficient for the conversion of the sulphates in the mother lye, as above set forth.

The described process has many advantages irrespective of its simplicity and of the fact that there are no obnoxious waste lyes—in fact, there are no waste lyes—and these advantages consist in that the sodium chlorid not decomposed in the roasting of the ore is also recovered with the sodium by concentration of the lye, as described, in that the calcium chlorid used in the process may be cheaply obtained from the waste products of the manufacture of soda by the ammonia process, whereby the chlorine hitherto lost (and for the economical recovery of which many futile attempts have been made) is also utilized. The calcium carbonate employed in the precipitation of the iron may be as cheaply derived from the waste products resulting in the manufacture of caustic potash, while the concentration of the lye before the electrolytical treatment may be economically effected by the use of the exhaust-steam of the works.

Having thus described my invention, what I claim as new therein, and desire to secure by Letters Patent, is—

1. The herein described process of treating zinciferous or cupriferous lyes resulting from the lixiviation of chlorinated roasted ores, which consists in chemically extracting the metals in the lye, except the zinc, removing the sodium chlorid by concentration of the lye, extracting the zinc and chlorine from the remaining lye electrolytically, and effecting the chemical extraction in such manner that the final lye will consist essentially of a solution of calcium chlorid, for the purpose set forth.

2. The herein described process of treating zinciferous or cupriferous lyes resulting from the lixiviation of chlorinated roasted ores, which consists in converting the sulphates in the lye into chlorides by means of calcium chlorid, separating the resulting calcium sulphate from the lye, extracting the silver, if any be present, next the copper by electrolysis under evolution of chlorine, then chemically such other metals as may be present in the lye, concentrating the same by evaporation, removing the sodium chlorid therefrom, and subjecting the remaining lye to electrolysis and conducting the operations in such manner that a final lye consisting essentially of a solution of calcium chlorid is obtained, for the purpose set forth.

3. The process of treating zinciferous and cupriferous lyes, resulting from the lixiviation of chlorinated roasted ores, which consists in converting the sulphates in the lyes into chlorides by means of calcium chlorid, separating the resulting calcium sulphate, extracting the copper, iron, and other metals successively from the lye, then concentrating the latter by evaporation, removing the solid sodium chlorid obtained and extracting the zinc electrolytically under evolution of chlorine from the remaining lye, substantially as and for the purpose set forth.

4. The herein described process of treating zinciferous lyes resulting from the lixiviation of chlorinated roasted ores, which consists in converting the sulphates in the lye into chlorides by means of calcium chlorid, separating the calcium sulphate from the lye, extracting the silver, if any be present, converting the iron into a hydroxid by means of a suitable agent as carbonate of calcium, converting the nickel, cobalt &c. into oxids by means of chlorine, preferably in the form of hypochlorite of lime, whereby an equivalent quantity of calcium chlorid is formed, and concentrating the lye by evaporation, whereby the sodium chlorid is obtained in solid form and the remaining lye placed in condition for the extraction of the zinc.

5. The herein described process of treating zinciferous lyes resulting from the lixiviation of chlorinated roasted ores, which consists in converting the sulphates in the lye into chlorides by means of calcium chlorid, separating the calcium sulphate from the lye, extracting the silver, if any be present, converting the iron into a hydroxid by means of carbonate of calcium, converting the nickel, cobalt &c. into oxids by means of chlorine, preferably in the form of hypochlorite of lime, whereby an equivalent quantity of calcium chlorid is formed, and concentrating the lye by evaporation, whereby the sodium chlorid is obtained in solid form, and extracting the zinc and chlorine electrolytically from the remaining solution, whereby a final lye available in the process is obtained, substantially as set forth.

6. The herein described process of treating cupriferous lyes resulting from the lixiviation of chlorinated roasted ores, which consists in converting the sulphates in the lye into chlorides by means of calcium chlorid, separating the resulting calcium sulphate from the lye, extracting the silver, if any be present, in a well known manner, then the copper by means of metallic iron, concentrating the solution by evaporation after removal of other metals if any be present in the lye, removing the sodium chlorid from the lye and extracting the remaining copper electrolytically under formation of chlorine, whereby a final lye consisting essentially of a solution of calcium chlorid is obtained after removal of the iron therefrom, for the purpose set forth.

In testimony that I claim the foregoing as my invention I have signed my name in presence of two subscribing witnesses.

HUGO BREWER.

Witnesses:
ANNA SIMON,
WILLIAM ESSEMOEIN.